(12) United States Patent
Aiba et al.

(10) Patent No.: US 10,974,424 B2
(45) Date of Patent: Apr. 13, 2021

(54) MOLD APPARATUS

(71) Applicant: SODICK CO., LTD., Kanagawa (JP)

(72) Inventors: Shuji Aiba, Kanagawa (JP); Satoru Inoue, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 0 days.

(21) Appl. No.: 16/378,575

(22) Filed: Apr. 9, 2019

(65) Prior Publication Data
US 2019/0315032 A1 Oct. 17, 2019

(30) Foreign Application Priority Data
Apr. 17, 2018 (JP) .............................. JP2018-078848

(51) Int. Cl.
*B29C 45/27* (2006.01)
*B29C 45/26* (2006.01)

(52) U.S. Cl.
CPC .......... *B29C 45/2673* (2013.01); *B29C 45/27* (2013.01)

(58) Field of Classification Search
CPC .................. B29C 45/27; B29C 33/306; B29C 2045/4078; B29C 45/2675; B29C 45/2673; B29C 45/2602; B29C 45/2701
See application file for complete search history.

(56) References Cited

U.S. PATENT DOCUMENTS

| | | | | |
|---|---|---|---|---|
| 3,724,802 A * | 4/1973 | Veneria | ............... | B29C 45/2602 425/443 |
| 3,897,929 A * | 8/1975 | Hartmann | ............... | B29C 45/26 425/443 |
| 4,285,659 A * | 8/1981 | Koike | ..................... | B29C 45/27 425/547 |
| 4,620,958 A * | 11/1986 | Wiechard | ............... | B29C 45/26 264/297.2 |
| 2007/0290119 A1* | 12/2007 | Cerniglia | ............... | B29C 45/17 249/67 |
| 2009/0269434 A1* | 10/2009 | Starkey | ............... | B29C 45/2602 425/542 |

FOREIGN PATENT DOCUMENTS

| | | | | |
|---|---|---|---|---|
| DE | 1014316 B | * | 8/1957 | ............. B29C 45/38 |
| JP | 2857841 | | 2/1999 | |
| JP | 5794242 | | 10/2015 | |

* cited by examiner

*Primary Examiner* — Robert B Davis
(74) *Attorney, Agent, or Firm* — JCIPRNET

(57) ABSTRACT

A mold apparatus includes a first mold plate formed with a runner flow path, a second mold plate, a runner stripper plate having a through hole that communicates with the runner flow path, a runner locking part formed with an inverse tapered space which communicates with the through hole and has an inverse tapered shape and in which a locking portion made of a molding material is formed, and a runner unlocking means for moving the runner stripper plate away from the runner locking part to unlock the locking portion.

11 Claims, 10 Drawing Sheets

MOLD APPARATUS

CROSS-REFERENCE TO RELATED APPLICATION

This application claims the priority benefit of Japan application serial no. 2018-078848, filed on Apr. 17, 2018. The entirety of the above-mentioned patent application is hereby incorporated by reference herein and made a part of this specification.

BACKGROUND

Technical Field

The disclosure relates to a mold apparatus. Particularly, the disclosure relates to a three-plate type mold apparatus.

Description of Related Art

There is a conventional three-plate type mold apparatus, which includes a movable side mold, a fixed side mold, and a runner stripper plate, as disclosed in Patent Document 1. In this three-plate type mold apparatus, the molded product and the sprue runner are molded as separate bodies, and the molded product and the sprue runner are separated at a gate by the runner stripper plate. When the molded product and the sprue runner are separated from each other, generally the sprue runner is held by a runner lock pin that has an undercut shape at the tip.

A cassette type mold apparatus is also known, which includes a base mold and a cassette mold. The base mold has a fixed base mold and a movable base mold, and the cassette mold can be loaded into the base mold. In terms of such cassette molds, there is a conventional three-plate type cassette mold, which includes a fixed mold plate, a movable mold plate, and a runner stripper plate, as disclosed in Patent Document 2. For the three-plate type cassette mold, the holding of the sprue runner for detaching the molded product and the sprue runner from each other is generally realized by a runner lock pin as well.

However, in the mold apparatus that has the runner lock pin as described above, it is necessary to dispose a through hole for inserting the runner lock pin, a driving device for the runner lock pin, etc. in addition to the runner lock pin. Therefore, there may be design restrictions on the shape of the molded product and the layout of each part. Particularly, for the cassette type mold apparatus as disclosed in Patent Document 2, the positions of the runner flow path and gate of the cassette mold are very limited according to the design of the runner lock pin of the base mold.

RELATED ART

Patent Document(s)

Patent Document 1: Japanese Patent No. 5794242
Patent Document 2: Japanese Patent No. 2857841

SUMMARY

In view of the above, the disclosure provides a three-plate type mold apparatus having a structure with fewer design restrictions. Additional objects and advantages of the disclosure will be set forth in the description that follows.
Means for Solving the Problems According to the disclosure, a mold apparatus is provided, which includes:
a first mold plate formed with a runner flow path through which a molding material supplied from a sprue flow path flows, a gate through which the molding material supplied from the runner flow path flows, and a part of a cavity space which is filled with the molding material supplied from the gate and in which a molded product is molded;
a second mold plate formed with a part of the cavity space and relatively moving in a mold opening/closing direction with respect to the first mold plate;
a runner stripper plate having a through hole that communicates with the runner flow path;
a runner locking part formed with an inverse tapered space that communicates with the through hole and has an inverse tapered shape, wherein a locking portion made of the molding material is formed in the inverse tapered space; and
a runner unlocking means moving the runner stripper plate away from the runner locking part to unlock the locking portion.

Effects

According to the mold apparatus of the disclosure, the sprue runner is held by the locking portion made of the molding material formed by the molding material in the inverse tapered space that has an inverse tapered shape, and the runner stripper plate is moved away from the runner locking part, in which the locking portion is formed, to unlock the locking portion, so as to release the sprue runner. With such a configuration, the sprue runner is held and released from the holding. Therefore, the flexibility of mold design is further improved.

DESCRIPTION OF THE EMBODIMENTS

Figure 1:
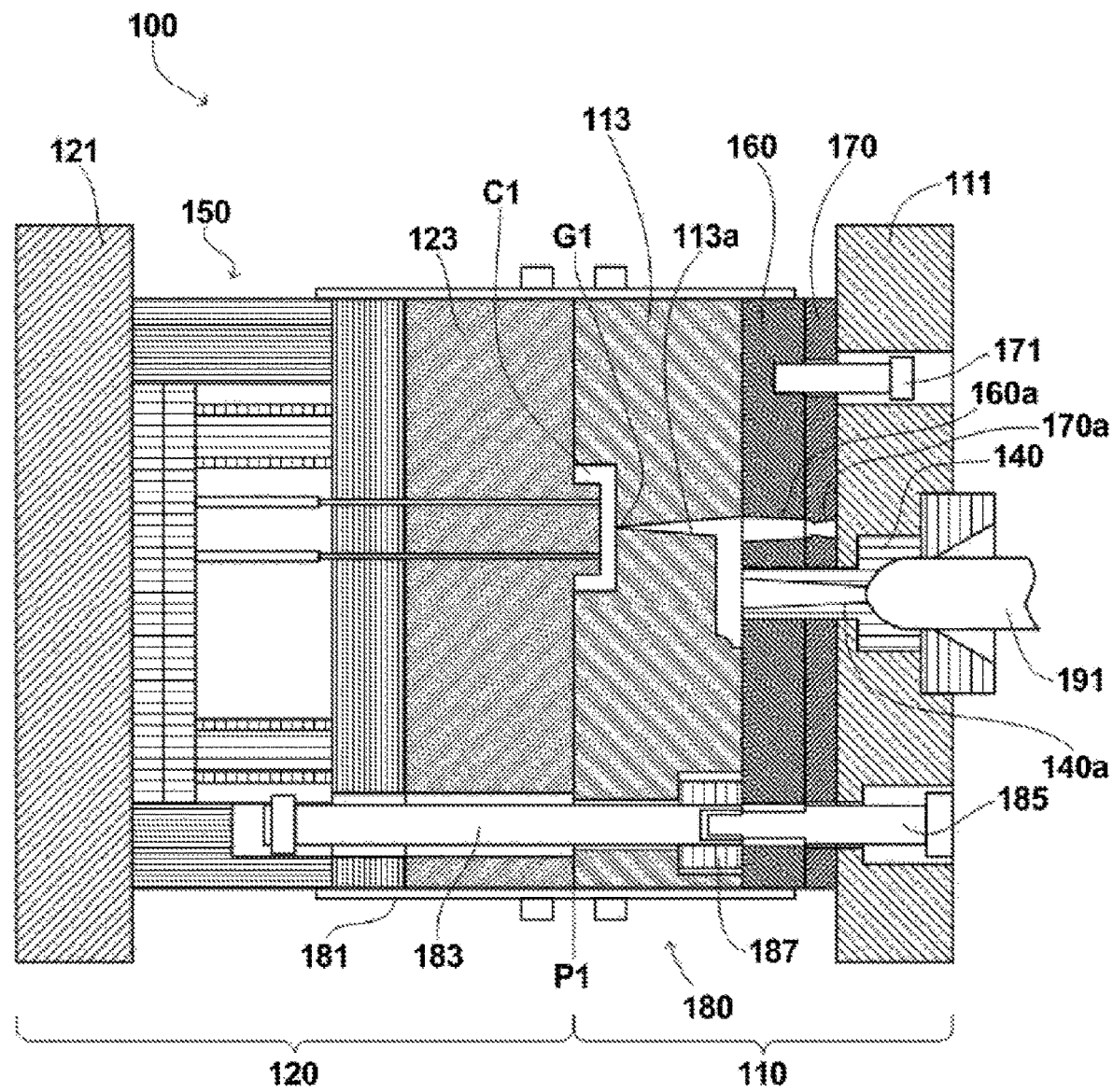
FIG. 1 is a partially cutaway side view showing the mold apparatus of the first embodiment in a mold closed state.

Embodiments of the disclosure will be described in detail below with reference to the drawings. A mold apparatus 100 of the first embodiment is configured with the side where a molding material is supplied as the fixed side. In other words, the first attaching plate corresponds to a fixed side attaching plate 111, the first mold plate corresponds to a fixed mold plate 113, the second attaching plate corresponds to a movable side attaching plate 121, and the second mold plate corresponds to a movable mold plate 123.

Figure 2:
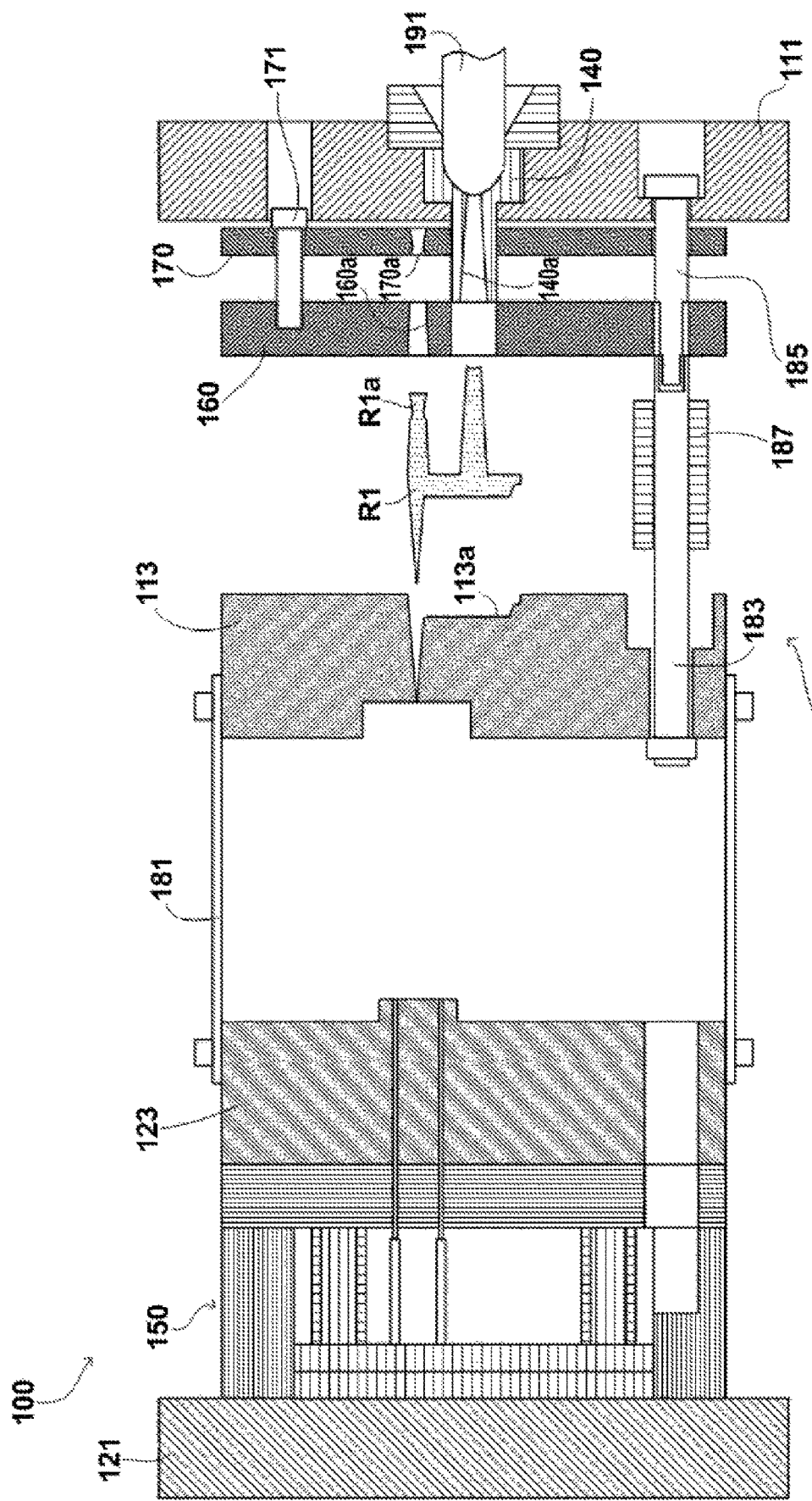
FIG. 2 is a partially cutaway side view showing the mold apparatus of the first embodiment in a mold opened state.

The mold apparatus 100 of the first embodiment shown in FIG. 1 and FIG. 2 includes a fixed side mold 110 and a movable side mold 120. The fixed side mold 110 includes the fixed side attaching plate 111, the fixed mold plate 113, and a runner stripper plate 160. The movable side mold 120 includes the movable side attaching plate 121 and the movable mold plate 123. The fixed side attaching plate 111 and the movable side attaching plate 121 are attaching plates respectively fixed to a fixed platen and a movable platen in a mold clamping apparatus of a molding machine (not shown). The movable side mold 120 is movable by the movable platen in a mold opening/closing direction, that is, a direction of moving close to or away from the fixed side mold 110 (the right-left direction in FIG. 1 and FIG. 2).

The fixed side mold 110 is provided with a sprue bush 140. At least a part of a sprue flow path 140a, which serves as the supply path of the molding material into the mold apparatus 100, is formed in the sprue bush 140. The movable side mold 120 is provided with an ejector device 150 that includes an ejector pin or the like for pushing out and releasing a molded product from the movable mold plate 123. A runner flow path 113a, through which the molding material supplied from the sprue flow path 140a flows, is formed in the fixed mold plate 113. FIG. 1 shows a mold closed state where the fixed mold plate 113 and the movable mold plate 123 are in close contact with each other at a parting surface P1, and a cavity space C1 in which the molded product is formed is formed between the fixed mold plate 113 and the movable mold plate 123. Normally, the sprue flow path 140a has a draft angle shape. A space for communicating with the runner flow path 113a to form a cold slug well, which serves as a cold slug pool, may be formed as necessary.

An injection unit of the molding machine for injecting molten molding material is disposed on the side where the molding material is supplied, that is, the fixed side in the first embodiment. The injection unit melts and plasticizes the molding material and extrudes the molten molding material with an injection shaft of a screw, a plunger or the like to inject it from a nozzle part 191. The molding material injected from the nozzle part 191 is sent to the sprue flow path 140a of the sprue bush 140, passes through the runner flow path 113a formed in the fixed mold plate 113, and is filled into the cavity space C1 via a gate G1. The gate G1 is a pinpoint gate having an extremely small opening diameter.

As clearly shown in FIG. 1 and FIG. 2, the runner stripper plate 160 is formed with a through hole 160a that communicates with the runner flow path 113a. The through hole 160a penetrates the runner stripper plate 160. The through hole 160a preferably has a draft tapered shape. An inverse tapered space 170a is formed in the runner locking plate 170 that is positioned on the side of the fixed side attaching plate 111 with respect to the runner stripper plate 160. The inverse tapered space 170a has an inverse tapered shape at least in part and communicates with the through hole 160a on the side of the runner stripper plate 160. The inverse tapered space 170a is provided with a runner locking part in which a locking portion R1a made of the molding material is formed. In the first embodiment, the runner locking part is provided in the runner locking plate 170 that is provided between the fixed side attaching plate 111 and the runner stripper plate 160. The molding material flows from the runner flow path 113a into the inverse tapered space 170a via the through hole 160a to form the locking portion R1a that holds a sprue runner R1. The aforementioned "inverse tapered shape" indicates that the cross-sectional area of the shape of the inverse tapered space 170a gradually increases from the space end portion on the side communicating with the opening of the through hole 160a (the left end portion in FIG. 1 and FIG. 2) toward the end portion on the opposite side (the right end portion in FIG. 1 and FIG. 2). The taper angle of the inverse tapered space 170a is 1 degree to 10 degrees, for example. The position and number of the locking portions R1a are not limited as long as the locking portion R1a holds the sprue runner R1. In other words, it suffices if the inverse tapered space 170a communicates with the runner flow path 113 a via the through hole 160a. In order to properly hold the sprue runner R1 when detaching the molded product and the sprue runner R1 from each other, it is desirable to dispose the locking portion R1a at a position corresponding to the gate G1, that is, substantially coaxially with the gate G1 in the mold opening/closing direction.

Although the runner locking plate 170 may be constantly fixed to the fixed side attaching plate 111, it is desirable that a predetermined gap be formed between the fixed side attaching plate 111 and the runner locking plate 170 during unlocking. As air flows in through the gap, the unlocking becomes easy. In this case, a runner locking plate moving means 171 is provided for moving the runner locking plate 170 in the direction to be away from or into contact with the fixed side attaching plate 111. The runner locking plate moving means 171 is, for example, a bolt. The head portion of the bolt can be locked to the runner locking plate 170, and the shaft portion of the bolt is inserted through the runner locking plate 170 and the end portion is fixed to the runner stripper plate 160. In this way, when the runner stripper plate 160 moves in the mold opening direction, the runner locking plate moving means 171 pushes and moves the runner locking plate 170. According to the configuration as described above, it is not necessary to separately provide a driving device or the like, and the runner locking plate 170 can be moved with a simple configuration, which is preferable. The disclosure is not limited to the above configuration and a cylinder may be provided to serve as the runner locking plate moving means 171.

Here, a runner unlocking means 180 is provided for moving the runner stripper plate 160 away from the runner locking part to unlock the locking portion R1a. The runner unlocking means 180 includes a tension link 181, a puller bolt 183, and a stop bolt 185, for example. The tension link 181 connects the fixed mold plate 113 and the movable mold plate 123 to limit the degree of opening between the fixed mold plate 113 and the movable mold plate 123. The puller bolt 183 has a head portion that can lock the fixed mold plate 113. The stop bolt 185 has a head portion that can lock the fixed side attaching plate 111. The runner stripper plate 160 is interposed between and connected with an end portion of the puller bolt 183 and an end portion of the stop bolt 185. In addition, an urging means 187 such as a spring is wound around the puller bolt 183 and provided between the fixed mold plate 113 and the runner stripper plate 160.

Hereinafter, mold opening/closing of the mold apparatus 100 of the first embodiment and a method of taking out the molded product and the sprue runner R1 will be described. In a state where the mold apparatus 100 is clamped by the fixed platen and the movable platen with a predetermined mold clamping force, the molding material is fed from the nozzle part 191 of the injection unit toward the cavity space C1 through the sprue flow path 140a of the sprue bush 140. The molding material passes through the runner flow path 113a and is injected into the cavity space C1 from the gate G1. The injected molding material is then cooled and solidified into a molded product.

At this time, the molding material that flows into the sprue flow path 140a and the runner flow path 113a is also cooled and solidified into the sprue runner R1. The molding material also flows into the through hole 160a of the runner stripper plate 160. This molding material flows through the through hole 160a and is sent into the inverse tapered space 170a of the runner locking plate 170. The molding material sent into the inverse tapered space 170a is cooled and solidified into the locking portion R1a.

Next, the movable platen is operated in the mold opening direction. First, the urging means 187 opens the fixed mold plate 113 and the runner stripper plate 160. As a result, the molded product in the cavity space C1 and the sprue runner R1 are cut at the portion of the gate G1. At this time, the sprue runner R1 is held on the side of the runner stripper plate 160 and the runner locking plate 170 by the locking portion R1a.

Subsequently, the parting surface P1 between the fixed mold plate 113 and the movable mold plate 123 is opened. If the movable platen is further operated in the mold opening direction after the degree of opening between the fixed mold plate 113 and the movable mold plate 123 reaches a predetermined value, the fixed mold plate 113 is pulled out in the mold opening direction by the tension link 181, and then the runner stripper plate 160 is moved via the puller bolt 183 to be separated from the runner locking part. In this way, the locking portion R1a is disengaged from the inverse tapered space 170a of the runner locking plate 170. The movement stroke of the runner stripper plate 160 is limited by the stop bolt 185.

The unlocked sprue runner R1 is taken out from the mold apparatus 100 by using a conventional sprue runner take-out robot or the like. Further, the molded product is released by the ejector device 150 and taken out from the mold apparatus 100 by using a conventional molded product take-out robot or the like. Of course, the sprue runner R1 and the molded product may fall automatically to be taken out.

After the sprue runner R1 and the molded product are taken out, the movable platen is operated in the mold closing direction for mold closing and mold clamping of the mold apparatus 100.

Although the runner locking plate 170 is provided between the fixed side attaching plate 111 and the runner stripper plate 160, and the runner locking part is formed in the runner locking plate 170 in the first embodiment, the runner locking part may be formed in the fixed side attaching plate 111. However, it is more preferable to form the runner locking part in the runner locking plate 170, that is, to form the inverse tapered space 170a in the runner locking plate 170 for it is easy to manufacture.

In the mold apparatus 100 of the first embodiment, the side where the molding material is supplied is configured as the fixed side, but the side where the molding material is supplied may be configured as a movable side (not shown). In other words, the first attaching plate may correspond to the movable side attaching plate, the first mold plate may correspond to the movable mold plate, the second attaching plate may correspond to the fixed side attaching plate, and the second mold plate may correspond to the fixed mold plate. That is, the mold apparatus may include a movable side mold, a fixed side mold, a runner stripper plate, a runner locking part, and a runner unlocking means. The movable side mold includes a movable side attaching plate, a sprue bush formed with a sprue flow path to which a molding material is supplied, and a movable mold plate formed with a runner flow path through which the molding material supplied from the sprue flow path flows. The fixed side mold includes a fixed side attaching plate and a fixed mold plate. The runner stripper plate is provided between the movable side attaching plate and the movable mold plate and has a through hole that communicates with the runner flow path. The runner locking part is formed with an inverse tapered space that communicates with the through hole on the side of the movable side attaching plate and has an inverse tapered shape, and a locking portion made of the molding material is formed in the inverse tapered space. The runner unlocking means moves the runner stripper plate away from the runner locking part to unlock the locking portion. The mold apparatus may be configured so that the movable mold plate moves in the mold opening/closing direction with respect to the fixed mold plate to bring the movable mold plate and the fixed mold plate into contact to form a cavity space for molding a molded product, and the molding material sent from the sprue flow path and the runner flow path is filled into the cavity space via a gate.

Next, a mold apparatus 200 of the second embodiment will be described. The mold apparatus 200 of the second embodiment is a cassette type mold apparatus that includes a base mold and a cassette mold that can be loaded into the base mold. As described above, the disclosure is particularly effective for such a cassette type mold apparatus.

The mold apparatus 200 of the second embodiment shown in FIG. 3 to FIG. 6 is configured with the side where the molding material is supplied as the fixed side. In other words, the first base mold corresponds to a fixed side base mold 211, the first mold plate corresponds to a fixed mold plate 213, the second base mold corresponds to a movable side base mold 221, and the second mold plate corresponds to a movable mold plate 223.

The mold apparatus 200 includes the fixed side base mold 211, the movable side base mold 221, and a base intermediate mold 231 disposed between the fixed side base mold 211 and the movable side base mold 221. The fixed side base mold 211 and the movable side base mold 221 are respectively fixed to a fixed platen and a movable platen in a mold clamping apparatus of a molding machine (not shown). The movable side base mold 221 is movable by the movable platen in a mold opening/closing direction, that is, a direction of moving close to or away from the fixed side base mold 211 (the vertical direction in FIG. 3 to FIG. 6).

Figure 3:
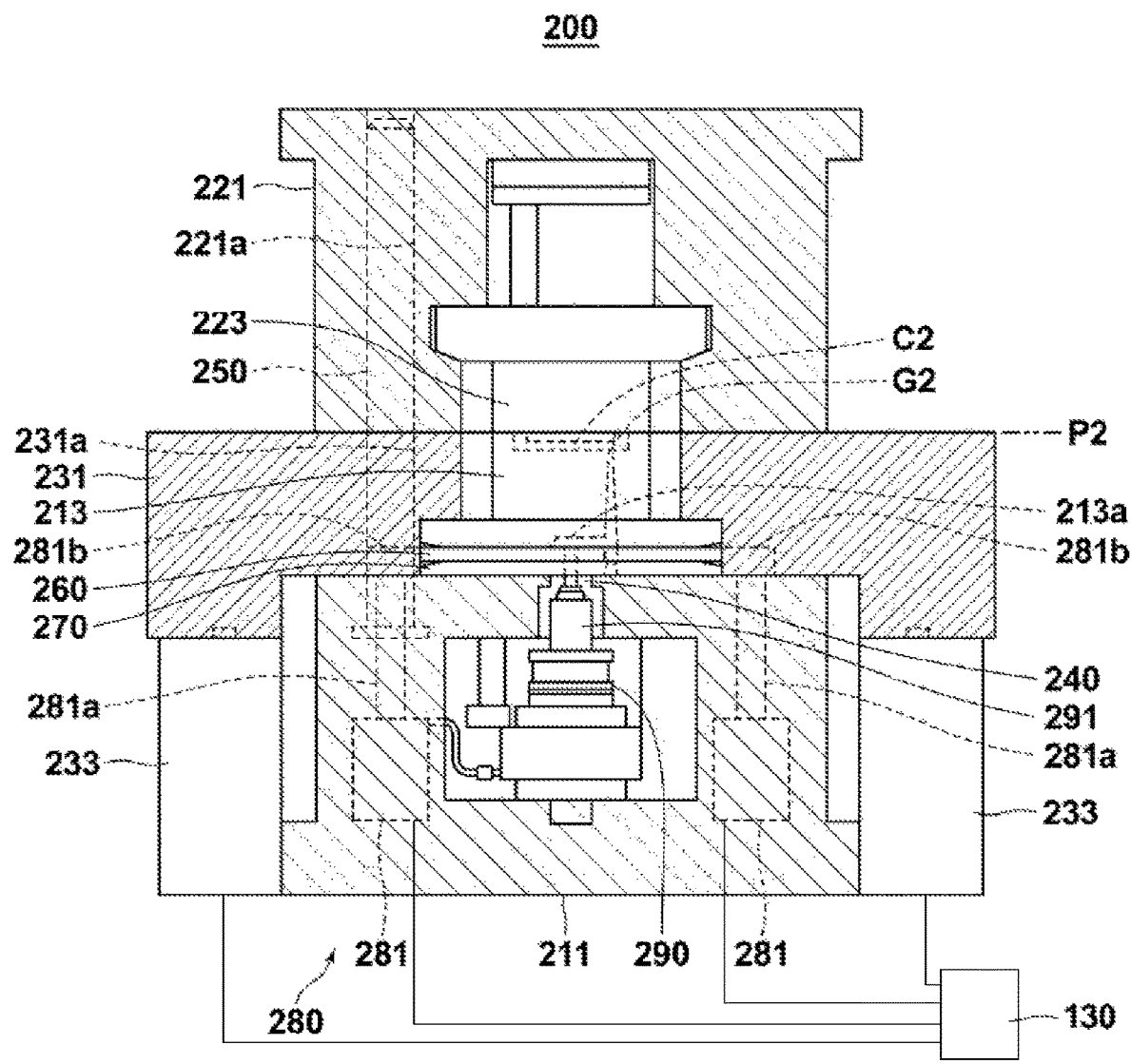
FIG. 3 is a partially cutaway side view showing the mold apparatus of the second embodiment in a mold closed state.
Figure 7:
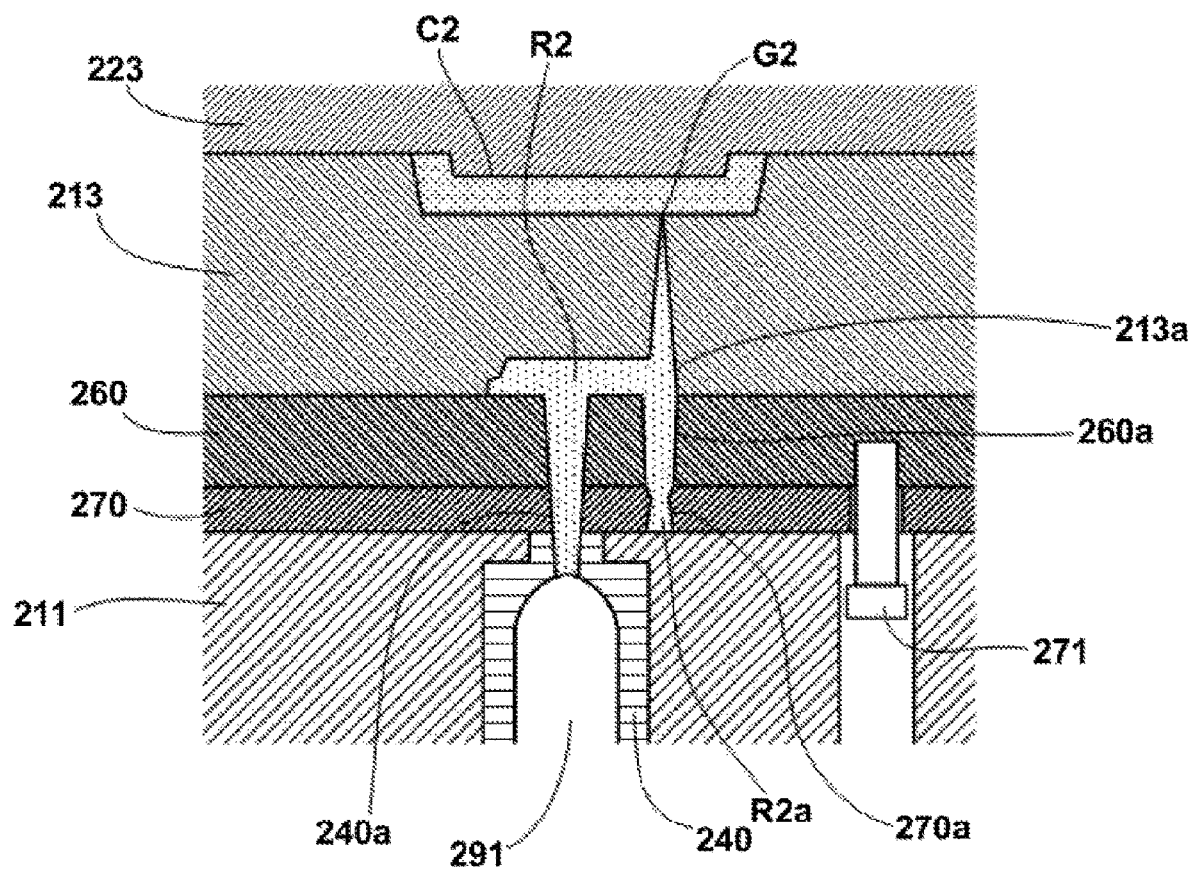
FIG. 7 is an enlarged side cross-sectional view of the area around the sprue runner of FIG. 3.
Figure 8:
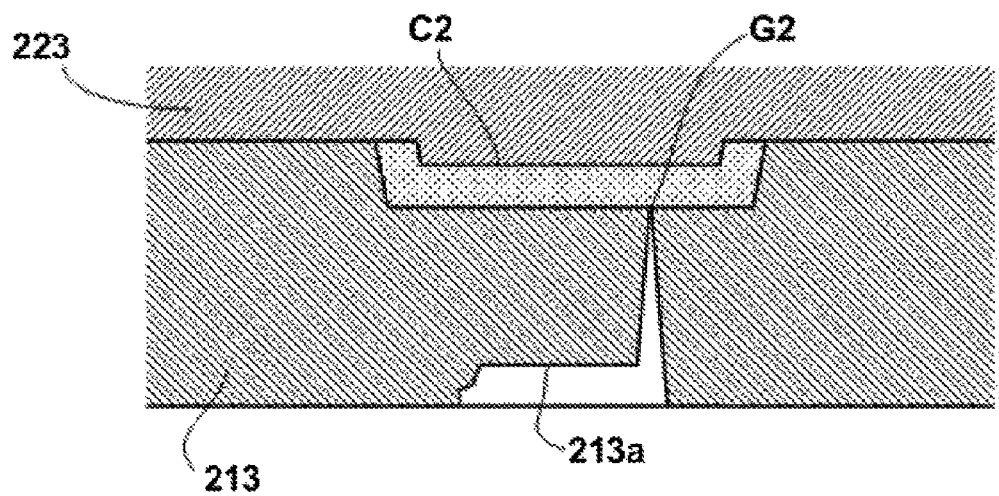
FIG. 8 is an enlarged side cross-sectional view of the area around the sprue runner of FIG. 4.
Figure 8:
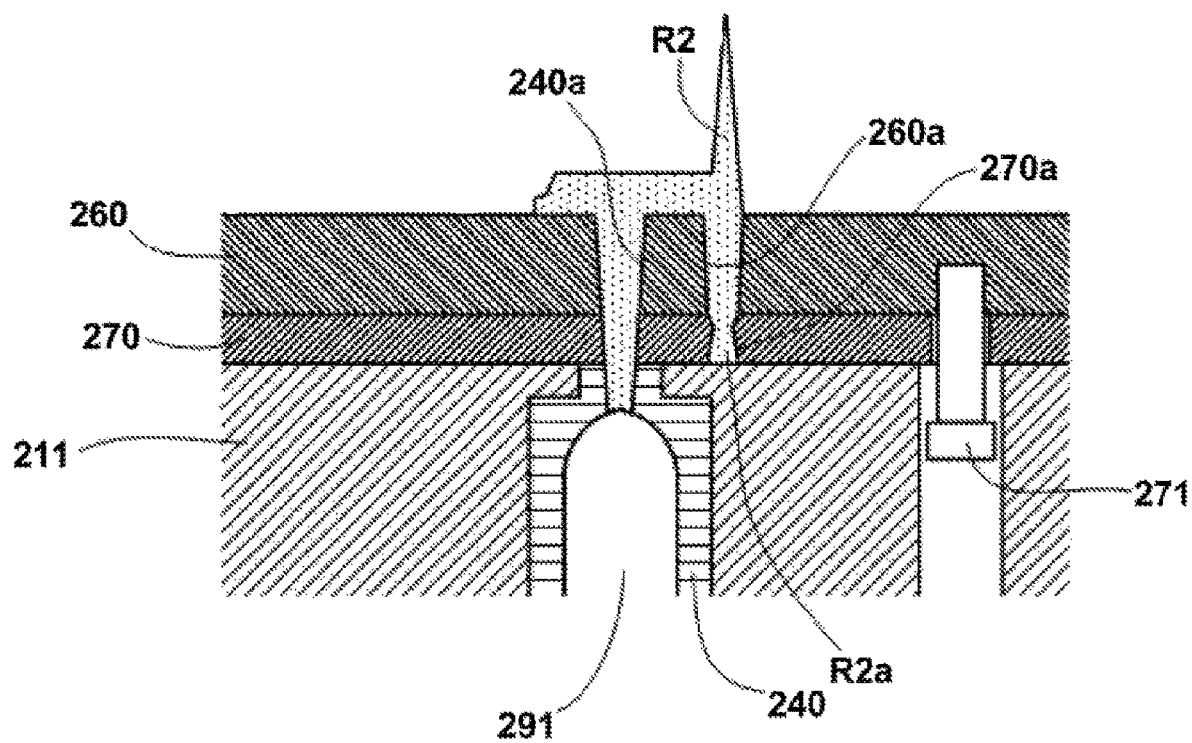

The fixed side base mold 211 is provided with a sprue bush 240. At least a part of a sprue flow path 240a, which serves as the supply path of the molding material into the mold apparatus 200, is formed in the sprue bush 240. The movable side base mold 221 is provided with an ejector device (not shown), in which the movable mold plate 223 is removably loaded and held. The ejector device includes an ejector pin or the like for pushing out and releasing the molded product from the movable mold plate 223. The fixed mold plate 213 is loaded and held in the base intermediate mold 231. A runner flow path 213a, through which the molding material supplied from the sprue flow path 240a flows, is formed in the fixed mold plate 213. FIG. 3 shows a mold closed state where the fixed mold plate 213 and the movable mold plate 223 are in close contact with each other at a parting surface P2, and a cavity space C2 in which the molded product is formed is formed between the fixed mold plate 213 and the movable mold plate 223. A runner stripper plate 260 is provided between the fixed side base mold 211 and the fixed mold plate 213. Preferably, a runner locking plate 270 is further provided between the runner stripper plate 260 and the fixed side base mold 211. As shown in FIG. 7 to FIG. 8, a part of the sprue flow path 240a is formed in the runner stripper plate 260. In addition, when the runner locking plate 270 is provided, a part of the sprue flow path 240a is formed in the runner locking plate 270. That is, in the second embodiment, the holes that are formed in the sprue bush 240, the runner stripper plate 260, and the runner locking plate 270 and communicate with each other serve as the sprue flow path 240a. Normally, the sprue flow path 240a has a draft tapered shape. A space for communicating with the runner flow path 213a to form a cold slug well, which serves as a cold slug pool, may be formed as necessary.

A base intermediate mold driving device 233, which is a pair of fluid pressure cylinders, for example, is fixed to the fixed side base mold 211. The base intermediate mold driving device 233 moves the base intermediate mold 231 and the fixed mold plate 213 in the mold opening/closing direction and positions and fixes them at any position between the fixed side base mold 211 and the movable side base mold 221. That is, the tip of a piston 233a of each base intermediate mold driving device 233 is connected to the base intermediate mold 231, and as these pistons 233a are extended or contracted synchronously with each other, the base intermediate mold 231 moves in the mold opening/closing direction, by which the fixed mold plate 213 moves in the mold opening/closing direction. The base intermediate mold driving device 233 is not limited to a pneumatic or hydraulic fluid pressure cylinder, and various driving devices such as an electric motor, e.g. a motor, may be used.

A guide rod 250 is fixed to the fixed side base mold 211. One end of the guide rod 250 is fixed to the fixed side base mold 211 and the guide rod 250 is disposed to extend from the fixed portion to the side of the movable side base mold 221. The movable side base mold 221 and the base intermediate mold 231 are respectively formed with guide holes 221a and 231a that extend in the mold opening/closing direction, and the guide rod 250 is inserted through the guide hole 221a and the guide hole 231a. Thereby, the movable side base mold 221 and the base intermediate mold 231 can move relatively in the mold opening/closing direction with respect to the fixed side base mold 211 independently of each other.

An injection unit 290 of the molding machine for injecting molten molding material is disposed on the side where the molding material is supplied, that is, the fixed side in the present embodiment. The injection unit 290 melts and plasticizes the molding material and extrudes the molten molding material with an injection shaft of a screw, a plunger or the like to inject it from a nozzle part 291. The molding material injected from the nozzle part 291 is sent to the sprue flow path 240a, passes through the runner flow path 213a, and is filled into the cavity space C2 via a gate G2. The gate G2 is a pinpoint gate having an extremely small opening diameter.

As clearly shown in FIG. 7, the runner stripper plate 260 is formed with a through hole 260a that communicates with the runner flow path 213a. The through hole 260a penetrates the runner stripper plate 260. The through hole 260a preferably has a draft tapered shape. An inverse tapered space 270a having an inverse tapered shape is formed in the runner locking plate 270 that is positioned on the side of the fixed side base mold 211 with respect to the runner stripper plate 260. The inverse tapered space 270a has the inverse tapered shape at least in part and communicates with the through hole 260a on the side of the runner stripper plate 260. The inverse tapered space 270a is provided with a runner locking part in which a locking portion R2a made of the molding material is formed. In the present embodiment, the runner locking part is provided in the runner locking plate 270. The molding material flows from the runner flow path 213a into the inverse tapered space 270a via the through hole 260a to form the locking portion R2a that holds a sprue runner R2. The aforementioned "inverse tapered shape" indicates that the cross-sectional area of the shape the inverse tapered space 270a as described above gradually increases from the space end portion on the side communicating with the opening of the through hole 260a (the upper end portion in FIG. 7) toward the end portion on the opposite side (the lower end portion in FIG. 7). The taper angle of the inverse tapered space 270a is 1 degree to 10 degrees, for example. The position and number of the locking portions R2a are not limited as long as the locking portion R2a holds the sprue runner R2. In other words, it suffices if the inverse tapered space 270a communicates with the runner flow path 213a via the through hole 260a. However, in order to properly hold the sprue runner R2 when detaching the molded product and the sprue runner R2 from each other, it is desirable to dispose the locking portion R2a at a position corresponding to the gate G2, that is, substantially coaxially with the gate G2 in the mold opening/closing direction.

Although the runner locking plate 270 may be constantly fixed to the fixed side base mold 211, it is desirable that a predetermined gap is formed between the fixed side base mold 211 and the runner locking plate 270 during unlocking. As air flows in through the gap, the unlocking becomes easy. In this case, a runner locking plate moving means 271 is provided for moving the runner locking plate 270 in the direction to be away from or into contact with the fixed side base mold 211. The runner locking plate moving means 271 is, for example, a bolt. The head portion of the bolt can be locked to the runner locking plate 270, and the shaft portion of the bolt is inserted through the runner locking plate 270 and the end portion is fixed to the runner stripper plate 260. In this way, when the runner stripper plate 260 moves in the mold opening direction, the runner locking plate moving means 271 presses and moves the runner locking plate 270. According to the configuration as described above, it is not necessary to separately provide a driving device or the like, and the runner locking plate 270 can be moved with a simple configuration, which is preferable. The disclosure is not limited to the above configuration and a cylinder may be disposed to serve as the runner locking plate moving means 271.

Here, a runner unlocking means 280 is provided for moving the runner stripper plate 260 away from the runner locking part to unlock the locking portion R2a. The runner unlocking means 280 is specifically a runner stripper plate driving device 281, which is a pair of fluid pressure cylinders, for example. The runner stripper plate driving device 281 is fixed to the fixed side base mold 211. In addition, the runner stripper plate 260 is connected to connection members 281b at two side end portions as an example, as shown in FIG. 3 to FIG. 6. The tips of the pistons 281a of the runner stripper plate driving device 281 are respectively connected to these connection members 281b. The runner stripper plate driving device 281 moves the runner stripper plate 260 to separate it from the runner locking part when unlocking the locking portion R2a. With such a configuration, it is possible to hold the sprue runner R2 without using a runner lock pin, and the flexibility of design of the mold apparatus 200 is improved. The runner stripper plate driving device 281 is not limited to a pneumatic or hydraulic fluid pressure cylinder, and various driving devices such as an electric motor, e.g. a motor, may be used.

Hereinafter, mold opening/closing of the mold apparatus 200 of the second embodiment and a method of taking out the molded product and the sprue runner R2 will be described. FIG. 3 shows the mold apparatus 200 in the mold closed state. In the mold closed state, the base intermediate mold driving device 233 contracts the piston 233a and brings the base intermediate mold 231 into close contact with the fixed side base mold 211. The runner stripper plate driving device 281 also contracts the piston 281a and brings the runner stripper plate 260 and the runner locking plate 270 that are in close contact with each other into close contact with the fixed side base mold 211. The movable side base mold 221 is moved in the mold closing direction by the aforementioned movable platen, and the movable mold plate 223 is brought into close contact with the fixed mold plate 213 at the parting surface P2. Particularly, during molding, the fixed mold plate 213 and the movable mold plate 223 are clamped by the fixed platen and the movable platen with a predetermined mold clamping force.

In this state, the molding material is fed from the nozzle part 291 of the injection unit 290 toward the cavity space C2 through the sprue flow path 240a. As shown in FIG. 7, the molding material passes through the runner flow patch 213a and is injected into the cavity space C2 from the gate G2. The injected molding material is then cooled and solidified into a molded product.

At this time, the molding material that flows into the sprue flow path 240a and the runner flow path 213a is also cooled and solidified into the sprue runner R2. The molding material also flows into the through hole 260a of the runner stripper plate 260. This molding material flows through the through hole 260a and is sent into the inverse tapered space 270a of the runner locking plate 270. The molding material sent into the inverse tapered space 270a is cooled and solidified into the locking portion R2a.

Figure 4:
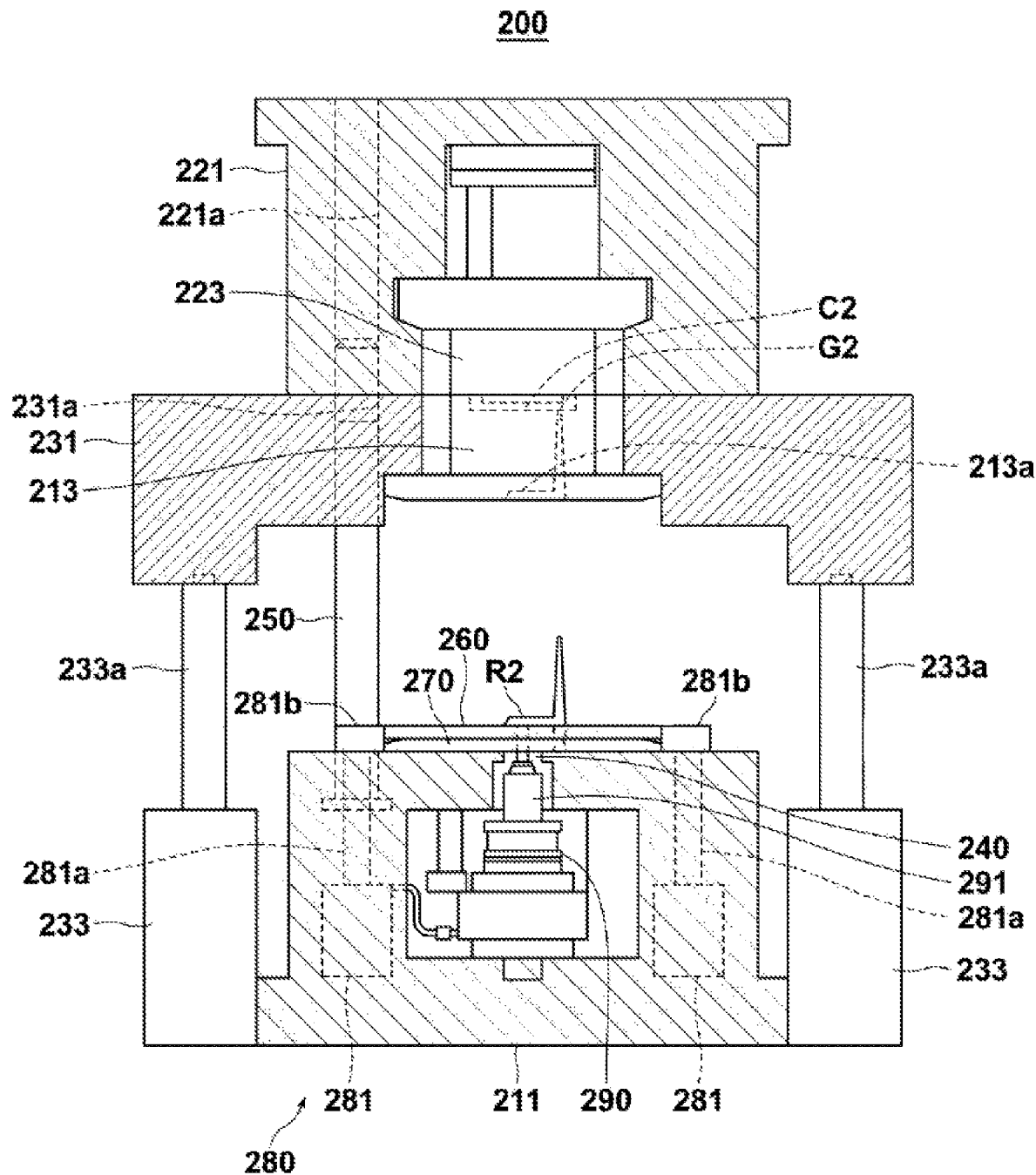
FIG. 4 is a partially cutaway side view showing the mold apparatus of the second embodiment in a state where the sprue runner and the molded product are detached.

Next, the mold apparatus 200 takes out the sprue runner R2. First, as shown in FIG. 4, the sprue runner R2 is detached from the molded product at the gate G2. That is, the movable platen is driven in the mold opening direction and the movable side base mold 221 moves in the mold opening direction. In synchronization with the driving of the movable platen, the base intermediate mold driving device 233 extends the piston 233a and separates the base intermediate mold 231 from the fixed side base mold 211 in a state where the fixed mold plate 213 and the movable mold plate 223 are in close contact with each other at the parting surface P2. When the fixed mold plate 213 is separated from the fixed side base mold 211 to a position that allows the sprue runner R2 to be taken out, the base intermediate mold driving device 233 positions and fixes the base intermediate mold 231 in a state where the fixed mold plate 213 and the movable mold plate 223 are in contact with each other. FIG. 8 shows in detail the state of the area around the sprue runner R2 at this time.

When the fixed mold plate 213 is separated from the fixed side base mold 211, the molded product in the cavity space C2 and the sprue runner R2 are cut at the portion of the gate G2. At this time, as shown in FIG. 8, the sprue runner R2 is held on the side of the runner stripper plate 260 and the runner locking plate 270 by the locking portion R2a.

Figure 5:
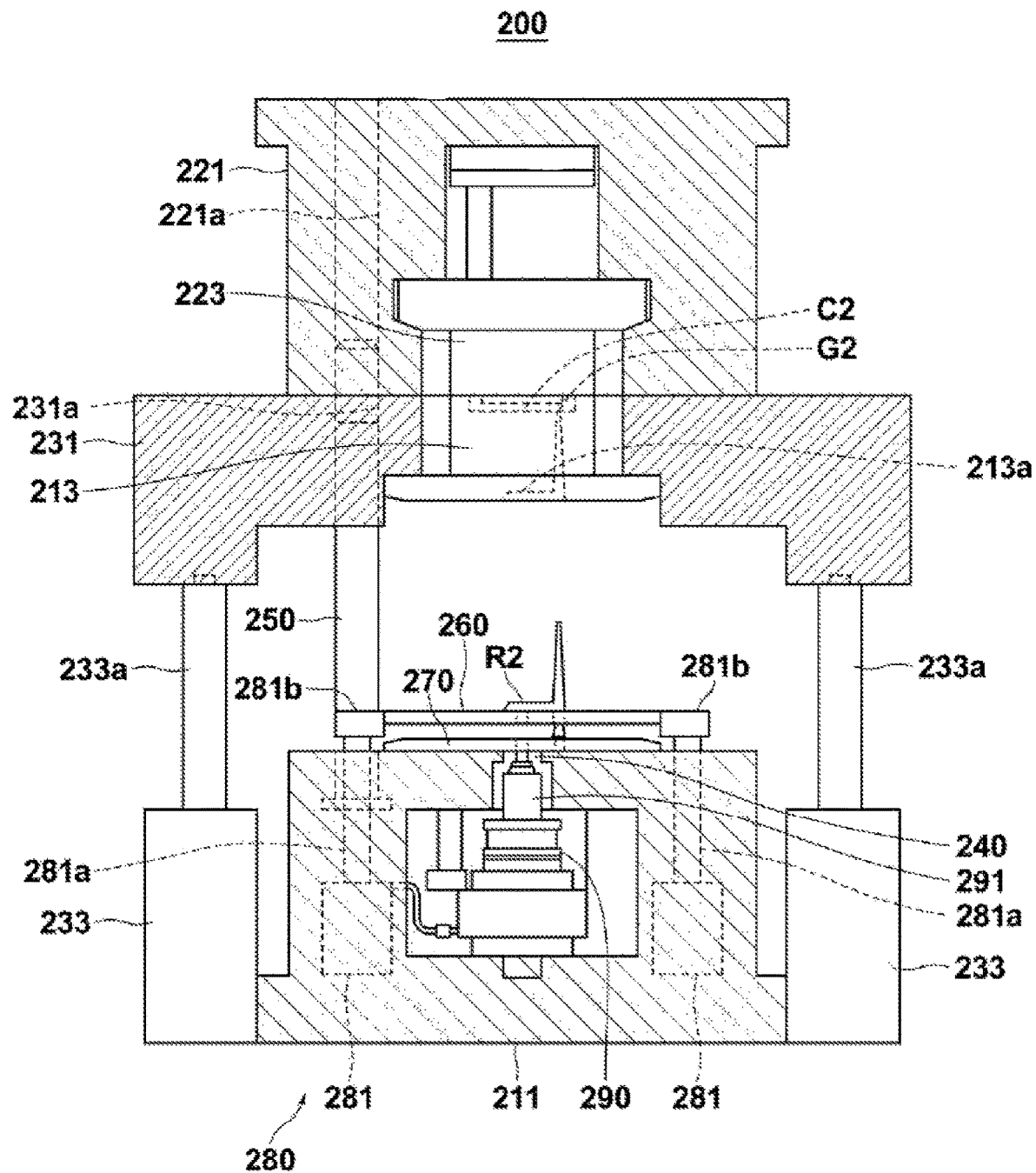
FIG. 5 is a partially cutaway side view showing the mold apparatus of the second embodiment in a state where the sprue runner is unlocked.
Figure 9:
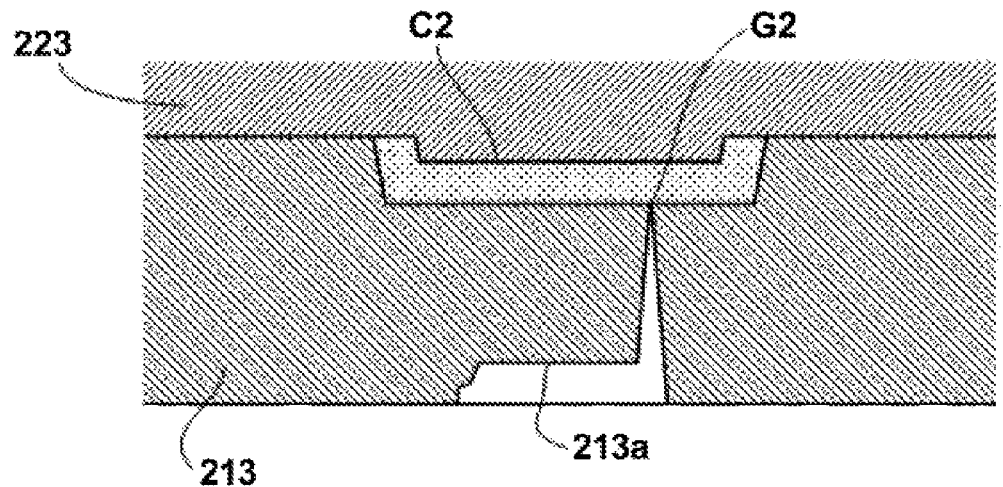
FIG. 9 is an enlarged side cross-sectional view of the area around the sprue runner of FIG. 5.
Figure 9:
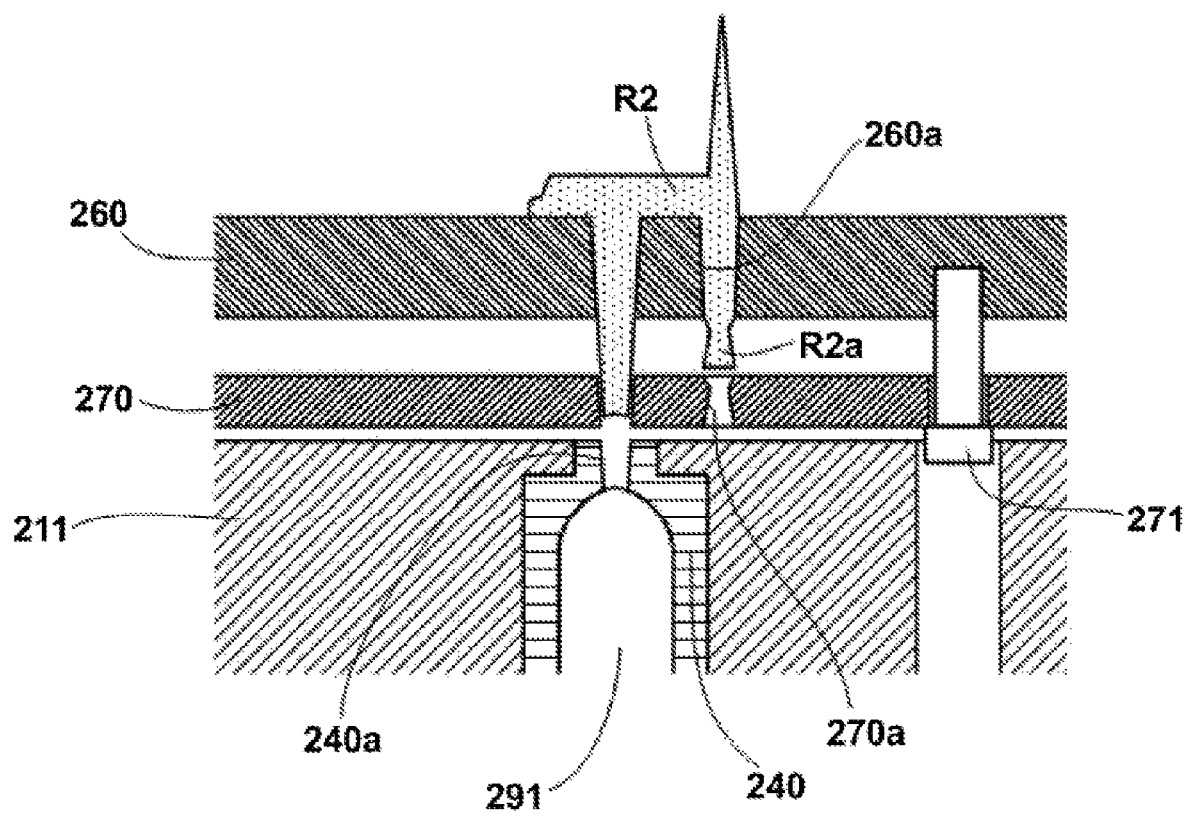

After the sprue runner R2 is detached from the molded product and the fixed mold plate 213 is separated from the fixed side base mold 211 to a position that allows the sprue runner R2 to be taken out, the mold apparatus 200 unlocks the sprue runner R2 as shown in FIG. 5. That is, the piston 281a of the runner stripper plate driving device 281 is extended to move the runner stripper plate 260 away from the runner locking part via the connection members 281b. FIG. 9 shows in detail the state of the area around the sprue runner R2 at this time.

As described above, the runner stripper plate 260 moves to be separated from the runner locking plate 270, so as to disengage the locking portion R2a from the inverse tapered space 270a of the runner locking plate 270. In this way, the sprue runner R2 is released from the locking of the runner locking plate 270. Therefore, the sprue runner R2 can be taken out from the mold apparatus 200 by using a conventional sprue runner take-out robot or the like.

Figure 6:
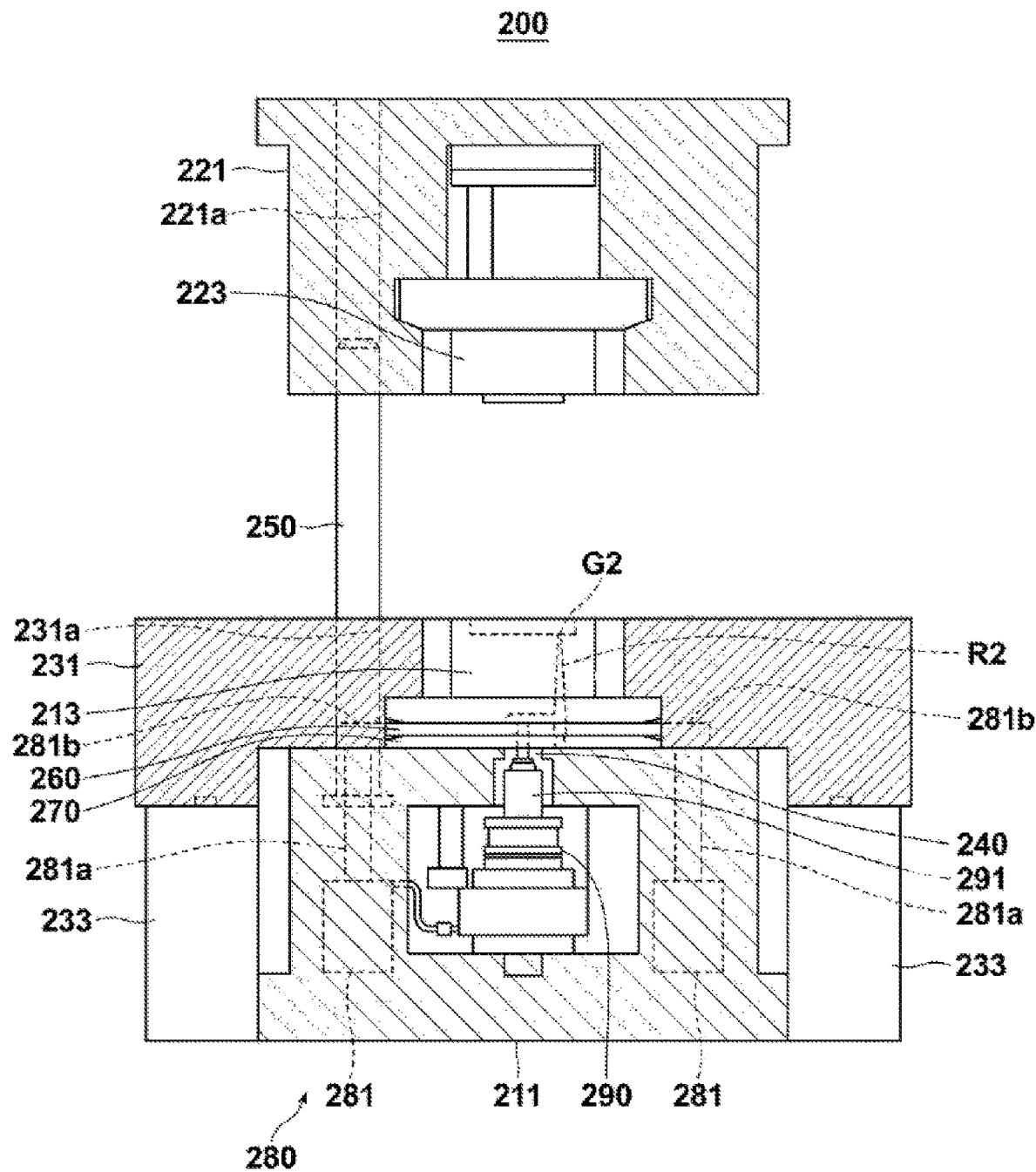
FIG. 6 is a partially cutaway side view showing the mold apparatus of the second embodiment in a state where the molded product is taken out.

Once the sprue runner R2 is taken out from the mold apparatus 200, the mold apparatus 200 then takes out the molded product. That is, as shown in FIG. 6, the piston 281a of the runner stripper plate driving device 281 is contracted and the runner stripper plate 260 is moved via the connection members 281b to a position to be in contact with the runner locking plate 270. Along with this, the piston 233a of the base intermediate mold driving device 233 is contracted and the base intermediate mold 231 is moved to a position to be in contact with the fixed side base mold 211. In other words, the base intermediate mold 231 is positioned and fixed so that the fixed mold plate 213 and the fixed side base mold 211 are in contact with each other. At this time, the parting surface P2 between the movable mold plate 223 and the fixed mold plate 213 is opened. Then, the molded product is released by the ejector device (not shown), and the molded product is taken out from the mold apparatus 200 by using a conventional molded product take-out robot or the like.

After the molded product is taken out as described above, the movable side base mold 221 is moved in the mold closing direction by the movable platen, and the mold apparatus 200 returns to the mold closed state shown in FIG. 3 to be prepared for molding the next molded product. The driving of the movable platen is controlled by a controller of the molding machine (not shown). The driving of the base intermediate mold driving device 233 and the runner stripper plate driving device 281 may also be performed by the controller of the molding machine or may be performed by an individual controller 130.

As described above, it is not essential to take out the sprue runner R2 in a state where the fixed mold plate 213 and the movable mold plate 223 are in contact with each other and take out the molded product in a state where the fixed mold plate 213 and the fixed side base mold 211 are in contact with each other, but it is possible to save the degree of mold opening of the mold apparatus 200 and further reduce the restrictions on the degree of mold opening, which is more desirable from the viewpoint of improving the flexibility of mold design.

Figure 10:
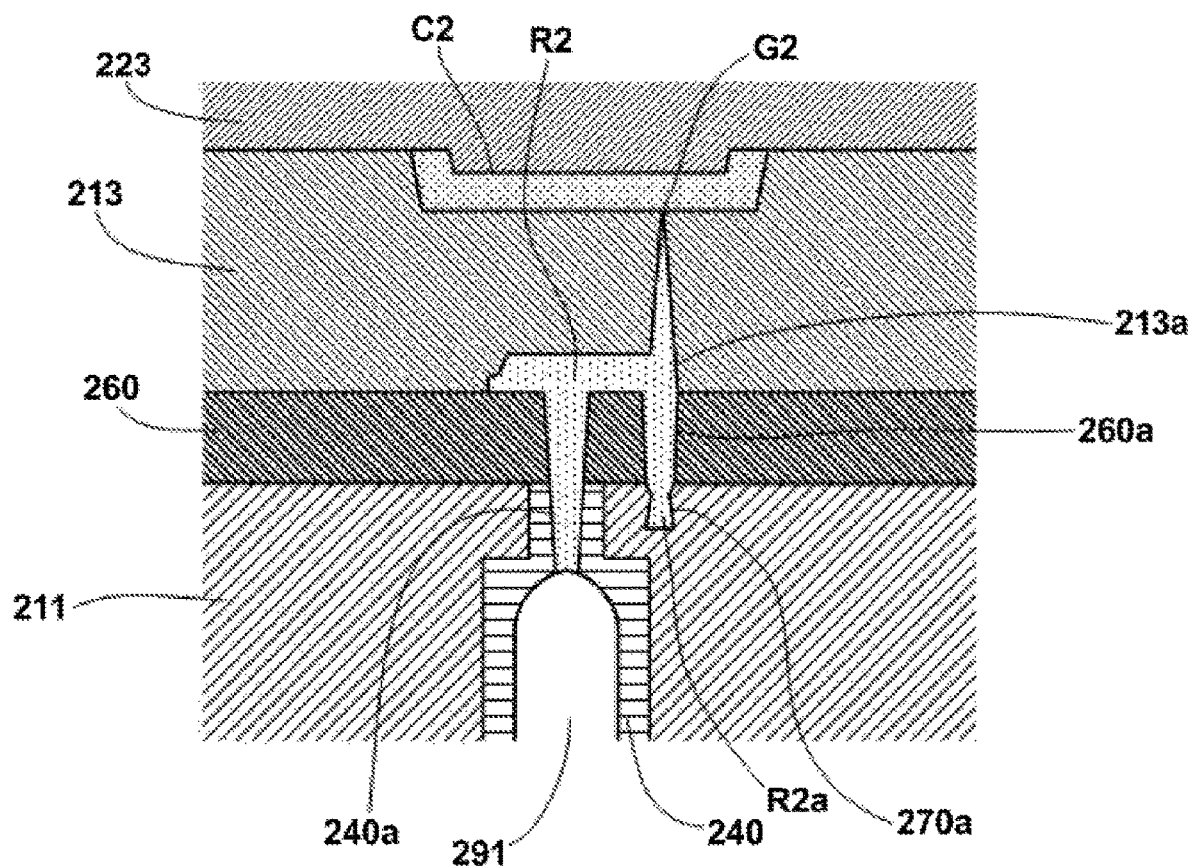
FIG. 10 is an enlarged side cross-sectional view of the area around the sprue runner, which shows a modified example of the runner locking part.

Although the runner locking plate 270 is provided between the fixed side base mold 211 and the runner stripper plate 260, and the runner locking part is formed in the runner locking plate 270 in the second embodiment, the runner locking part may be formed in the fixed side base mold 211 as shown in FIG. 10. Nevertheless, it is more preferable to form the runner locking part in the runner locking plate 270, that is, to form the inverse tapered space 270a in the runner locking plate 270 for it is easy to manufacture.

In the mold apparatus 200 of the second embodiment, the side where the molding material is supplied is configured as the fixed side, but the side where the molding material is supplied may be configured as the movable side. In other words, the mold apparatus may include a movable side base mold, a sprue bush provided in the movable side base mold and formed with at least a part of a sprue flow path to which a molding material is supplied, a movable mold plate formed with a runner flow path through which the molding material supplied from the sprue flow path flows, a base intermediate mold loaded with the movable mold plate, a fixed mold plate, a fixed side base mold loaded with the fixed mold plate, a runner stripper plate provided between the movable side base mold and the movable mold plate and having a through hole that communicates with the runner flow path, a runner locking part formed with an inverse tapered space which communicates with the through hole on the side of the movable side base mold and has an inverse tapered shape and in which a locking portion made of the molding material is formed, and a runner unlocking means moving the runner stripper plate away from the runner locking part to unlock the locking portion. The mold apparatus may be configured so that the movable mold plate moves in the mold opening/closing direction with respect to the fixed mold plate to bring the movable mold plate and the fixed mold plate into contact to form a cavity space for molding a molded product, and the molding material sent from the sprue flow path and the runner flow path is filled into the cavity space via a gate.

Including the first embodiment and the second embodiment, the mold apparatuses 100 and 200 of the disclosure can be mounted on a molding machine such as an injection molding machine, and the mold clamping device of the molding machine may be horizontal type or vertical type. The configurations shown in the first embodiment and the second embodiment can be combined with each other within a range where there is no technical contradiction. For example, the runner unlocking means 180 and 280 shown in the respective embodiments may be interchanged.

The embodiment was chosen in order to explain the principles of the disclosure and its practical application. Many modifications and variations are possible in light of the above teachings. It is intended that the scope of the disclosure be defined by the claims.

What is claimed is:

1. A mold apparatus, comprising:
    a first mold plate formed with a runner flow path through which a molding material supplied from a sprue flow path flows, a gate through which the molding material supplied from the runner flow path flows, and a part of a cavity space which is filled with the molding material supplied from the gate and in which a molded product is molded;
    a second mold plate formed with a part of the cavity space and relatively moving in a mold opening/closing direction with respect to the first mold plate;
    a runner stripper plate having a through hole that communicates with the runner flow path;
    a runner locking part formed with an inverse tapered space that communicates with the through hole and has an inverse tapered shape, wherein a locking portion made of the molding material is formed in the inverse tapered space; and
    a runner unlocking device moving the runner stripper plate away from the runner locking part to unlock the locking portion.

2. The mold apparatus according to claim 1, further comprising:
    a first attaching plate which is an attaching plate on the side of the first mold plate;
    a sprue bush formed with the sprue flow path; and
    a second attaching plate which is an attaching plate on the side of the second mold plate,
    wherein the runner stripper plate is provided between the first attaching plate and the first mold plate.

3. The mold apparatus according to claim 2, further comprising a runner locking plate provided between the first attaching plate and the runner stripper plate,
    wherein the runner locking part is provided in the runner locking plate.

4. The mold apparatus according to claim 3, further comprising a runner locking plate moving device moving the runner locking plate in a mold opening direction to form a predetermined gap between the first attaching plate and the runner locking plate.

5. The mold apparatus according to claim 2, wherein the runner locking part is provided in the first attaching plate.

6. The mold apparatus according to claim 1, further comprising:
    a first base mold;
    a sprue bush provided in the first base mold and formed with at least a part of the sprue flow path;
    a base intermediate mold loaded with the first mold plate; and
    a second base mold loaded with the second mold plate,
    wherein the runner stripper plate is provided between the first base mold and the first mold plate.

7. The mold apparatus according to claim 6, further comprising a runner locking plate provided between the first base mold and the runner stripper plate,
    wherein the runner locking part is provided in the runner locking plate.

8. The mold apparatus according to claim 7, further comprising a runner locking plate moving device moving the runner locking plate in a mold opening direction to form a predetermined gap between the first base mold and the runner locking plate.

9. The mold apparatus according to claim 6, wherein the runner locking part is provided in the first base mold.

10. The mold apparatus according to claim 1, wherein the runner unlocking device comprises a runner stripper plate driving device that moves the runner stripper plate in a mold opening direction.

11. The mold apparatus according to claim 1, wherein the runner unlocking device comprises:
    a tension link connecting the first mold plate and the second mold plate to limit a degree of opening between the first mold plate and the second mold plate;
    a puller bolt having a head portion for locking the first mold plate; and
    a stop bolt having a head portion for locking the first base mold,
    wherein the runner stripper plate is interposed between and connected with an end portion of the puller bolt and an end portion of the stop bolt.

* * * * *